(12) United States Patent
McElroy

(10) Patent No.: US 11,022,089 B2
(45) Date of Patent: Jun. 1, 2021

(54) ELECTRICITY GENERATOR AND A METHOD OF GENERATING ELECTRICITY

(71) Applicants: Static Hydro Energy (S.H.E.) Limited, Clonshaugh (IE); Owen McElroy, Swords (IE)

(72) Inventor: Owen McElroy, Swords (IE)

(73) Assignee: STATIC HYDRO ENERGY (S.H.E.) LIMITED, Dublin (IE)

( * ) Notice: Subject to any disclaimer, the term of this patent is extended or adjusted under 35 U.S.C. 154(b) by 47 days.

(21) Appl. No.: 16/308,242

(22) PCT Filed: Jun. 9, 2017

(86) PCT No.: PCT/EP2017/064177
§ 371 (c)(1),
(2) Date: Dec. 7, 2018

(87) PCT Pub. No.: WO2017/212046
PCT Pub. Date: Dec. 14, 2017

(65) Prior Publication Data
US 2019/0249641 A1    Aug. 15, 2019

(30) Foreign Application Priority Data
Jun. 9, 2016 (GB) .................................... 1610064

(51) Int. Cl.
*F03B 13/06* (2006.01)
*H02K 11/00* (2016.01)
(Continued)

(52) U.S. Cl.
CPC ............ *F03B 13/06* (2013.01); *F03B 17/005* (2013.01); *H02K 7/1823* (2013.01);
(Continued)

(58) Field of Classification Search
CPC ...... F03B 13/06; F03B 17/005; H02K 7/1823; H02K 11/0094; H02K 11/046; F05D 2220/62; F05D 2220/76
See application file for complete search history.

(56) References Cited

U.S. PATENT DOCUMENTS

2002/0144503 A1*  10/2002  Merswolke ............... F03D 9/28
                                                              60/398

FOREIGN PATENT DOCUMENTS

| CA | 2340463 A1 | 9/2002 |
| CH | 708605 A2 | 3/2015 |

(Continued)

OTHER PUBLICATIONS

International Search Report issued in International Application No. PCT/EP2017/064177 dated Nov. 10, 2017.

*Primary Examiner* — Tulsidas C Patel
*Assistant Examiner* — Joseph Ortega
(74) *Attorney, Agent, or Firm* — Brian J. Colandreo; Michael T. Abramson; Holland & Knight LLP

(57) ABSTRACT

This invention relates to an electricity generator comprising a pressure chamber having a releasably sealable air vent, a liquid supply, a sump tank configured to deliver liquid to the pressure chamber and a turbine. The electricity generator further comprises a piping network including an upright liquid conduit configured to deliver water from the pressure chamber through the turbine and back to the sump tank, a pressurized air supply operable to pressurize air in the pressure chamber, a plurality of valves, and a controller to operate the plurality of valves. In use, a small amount of air may be used to efficiently move a large body of water which in turn is used to power a turbine. The electricity generated by the turbine may be harvested and subsequently used, thereby reducing electricity spend. The installation is com- (Continued)

pact and may be installed in a factory or other installation where electricity requirement/spend are high.

22 Claims, 5 Drawing Sheets

(51) Int. Cl.
  *H02K 11/04* (2016.01)
  *H02K 7/18* (2006.01)
  *F03B 17/00* (2006.01)
(52) U.S. Cl.
  CPC ....... *H02K 11/0094* (2013.01); *H02K 11/046* (2013.01); *F05D 2220/62* (2013.01); *F05D 2220/76* (2013.01)

(56) References Cited

FOREIGN PATENT DOCUMENTS

| | | | |
|---|---|---|---|
| GB | 2013318 A | 8/1979 | |
| WO | WO-2016016668 A1 * | 2/2016 | .............. F04B 19/10 |

* cited by examiner

ELECTRICITY GENERATOR AND A METHOD OF GENERATING ELECTRICITY

CROSS-REFERENCE TO RELATED APPLICATIONS

This application is a U.S. National Stage of International Patent Application No. PCT/EP2017/064177, filed 9 Jun. 2017, which claims priority to Great Britain Patent Application No: 1610064.6, filed 9 Jun. 2016, the disclosure of which is incorporated herein by reference in its entirety.

TECHNICAL FIELD

This invention relates to an electricity generator and a method of generating electricity. The invention further relates to a method of utilising excess or waste pressurised air from an existing process to generate electricity.

BACKGROUND ART

For many years now, there has been a trend away from the use of fossil fuels and towards renewable energy supplies for electricity generation. Fossil fuel supplies such as coal, oil and gas are depleting rapidly and the burning of fossil fuels is thought to be harmful to the environment. Renewable energy supplies such as wind, wave, tidal and solar supplies are effectively infinite and are not thought to cause as much harm to the environment. Accordingly, there is a continual shift towards these renewable energy supplies as they are sustainable and believed to be less detrimental to the environment.

However, there are some problems with many of the known renewable energy supplies and the apparatus for harnessing the renewable energy supplies. For example, wind power is deemed practical only in those areas that experience reliable, predictable winds above a certain wind strength all year round. The wind turbines used to harness the power of the wind are thought to be relatively noisy and it is undesirable to locate so-called "wind farms" near populated areas. Therefore, there are many areas where it is not possible or desirable to locate wind farms.

Furthermore, in relation to wave and tidal power, it goes without saying that these forms of renewable energy supplies require a coastline and access to the sea or an ocean in order to operate. It is thought in many quarters that wave and tidal renewable energy supplies are still several years away from being economically viable alternatives to fossil fuels. Accordingly, these renewable energy supplies are not available everywhere and even in those areas where they are available, they are not necessarily commercially attractive. Solar energy apparatus efficiency have improved and their price have dropped so that they are realistic alternatives to fossil fuels. However in order to derive these benefits, it is still necessary to have a high degree of sunlight all year round. Therefore, solar energy is not a realistic alternative in all locations.

One form of renewable energy supply that is becoming increasingly popular and attracting more attention is hydroelectric power generation that uses underwater "waterfalls" to generate the electricity. The advantage of this type of renewable energy supply is that it simply requires a body of water, even a lake or a pond, man-made or naturally occurring, and does not rely on waves, tidal flow or other climactic conditions to operate. Generally speaking, these devices comprise a generator with a turbine that is submerged under the water. Water from above is dropped onto the turbine causing the turbine to rotate and this movement is translated into electricity. The water that has been used to turn the turbine is released from the generator back into the body of water and recirculated. Therefore, there is an endless, continuous supply of electricity that may be produced from operating such a generator.

One device that addresses many of the above problems is that described in the Applicant's co-pending PCT Patent Application Publication No. WO2014/180995 entitled "A submersible hydroelectric generator apparatus and a method of evacuating water from such an apparatus". Although the apparatus described in WO2014/180995 provides a useful alternative to the previously known devices, it would be advantageous to provide a device that does not have to be submerged in a body of water. By having a device that is not submerged, maintenance of the device will be greatly simplified and indeed the applications of the device would be greatly enhanced. For example, if the device does not have to be immersed in a body of water, the device could be installed in a factory or other location.

Various attempts have been made at producing electricity generators including a number of electricity generators that are not submerged. For example, PCT Patent Application Publication No. WO03/012288 in the name of Ito, Japanese Patent Application Publication No. JP2000009014 in the name of Tsunoda, and Canadian Patent Application Publication No. CA2340463 in the name of Kirchmann, all describe electricity generators that are not submerged. However, heretofore, none of these devices has proven entirely satisfactory.

In addition to the foregoing, there is a separate unrelated problem with existing manufacturing processes that operate using pressurised air. Generally speaking, a substantial amount of pressurised air is lost in these processes; this lost air is referred to as "blow-off". It is estimated that several billion euro are wasted each year generating pressurised air that is subsequently lost. It would be highly advantageous if this "blow-off" air could in fact be harnessed in some way and put to good use.

It is an object of the present invention to provide an electricity generator and a method of generating electricity that overcomes at least some of the above-identified problems and provides a useful alternative to the existing offerings.

SUMMARY OF INVENTION

According to the invention there is provided an electricity generator comprising;
  a pressure chamber having a releasably sealable air vent;
  a liquid supply;
  a sump tank configured to deliver liquid to the pressure chamber;
  a turbine;
  a piping network including an upright liquid conduit, the upright liquid conduit configured to deliver water from the pressure chamber through the turbine and back to the sump tank, the upright liquid conduit comprising a flow line for delivery of liquid from the pressure chamber up to a head height and a return line for delivery of water back down under gravity from the head height through the turbine to the sump tank;
  a pressurized air supply operable to pressurize air in the pressure chamber;
  a plurality of valves; and
  a controller to operate the plurality of valves.

By having such an electricity generator, it will be possible to construct the electricity generator on dry land rather than having it submerged. This will provide an electricity generator that is easier to maintain and more importantly, that can be located in a factory or other location where it is desirable to generate electricity. It has been found that a small volume of pressurised air, at a low pressure, is capable of raising a large volume of water that can then be used to drive a turbine. The electricity generator is efficient in operation and can provide a constant supply of electricity to an installation. The configuration of electricity generator described provides a functioning, commercially viable alternative to the known devices.

In one embodiment of the invention there is provided an electricity generator in which the pressurized air supply operable to pressurize air in the pressure chamber is configured to pressurize air in the pressure chamber to between 0.1 bar and 2.0 bar. It has been found that in the electricity generator according to the present invention, 0.7 bar of pressure is sufficient to raise 2.7 tonne of water to a height of 5.5 metres This water can then be used to fall over and drive a turbine and the electricity generated by the turbine can be harnessed. It will be understood that this is a very low pressure system. Indeed, a single bar of pressure can be generated using waste compressed air or a simple blower or like device that operates using low levels of electricity.

In one embodiment of the invention there is provided an electricity generator in which the pressurized air supply operable to pressurize air in the pressure chamber is configured to pressurize air in the pressure chamber to between 0.5 bar and 1.5 bar.

In one embodiment of the invention there is provided an electricity generator in which the pressurized air supply operable to pressurize air in the pressure chamber is configured to pressurize air in the pressure chamber to of the order of 0.7 bar. This pressure level has been found to provide an apparatus that is efficient in operation while at the same time not being too loud or obtrusive in operation.

In one embodiment of the invention there is provided an electricity generator in which the upright liquid conduit extends upwardly from the pressure chamber by a distance sufficient to create a head of water above the sump tank of between 1 metre and 10 metres. It will be understood that the higher the head of water, the greater the potential to generate electricity will be. The height will be driven in part by the amount of electricity required as well as the pressure level available to drive the water upwards to that height.

Furthermore, practically speaking, the height may be chosen to suit a particular installation's dimensions. The range of 1 to 10 metres is believed to offer a useful range for multiple disparate applications and facilities.

In one embodiment of the invention there is provided an electricity generator in which the upright liquid conduit extends upwardly from the pressure chamber by a distance sufficient to create a head of water above the sump tank of between 5.5 metres and 9 metres.

In one embodiment of the invention there is provided an electricity generator in which the upright liquid conduit extends upwardly from the pressure chamber by a distance sufficient to create a head of water above the sump tank of the order of 8 metres. This is seen as a particularly effective and compact arrangement that can provide sufficient electricity for many installations while remaining relatively compact.

In one embodiment of the invention there is provided an electricity generator in which there is provided an elevated turbine buffer tank intermediate the pressure chamber and the turbine. By having an elevated turbine buffer tank intermediate the pressure chamber and the turbine, it will be possible to ensure that there is a constant supply of water for delivery to the turbine and this will help alleviate problems caused by fluctuations in the turbine speed.

In one embodiment of the invention there is provided an electricity generator in which there is provided an exhaust tank intermediate the pressure chamber and the elevated turbine buffer tank.

In one embodiment of the invention there is provided an electricity generator in which the sump tank is provided with at least one baffle plate. By having a baffle plate, the water entering the sump tank will be calmed and less turbulent than would otherwise be the case. As an alternative to calming the water, the force of the water entering the sump tank could instead be used to help drive water faster into the pressure chamber. In one embodiment of the invention there is provided an electricity generator in which the sump tank has a depth of no less than 1 metre. This is seen as a useful alternative or additional water calming measure.

In one embodiment of the invention there is provided an electricity generator in which the sump tank is located directly above the pressure chamber. By having the sump tank directly above the pressure chamber, the water will be able to flow very quickly from the sump tank into the pressure chamber thereby making the generator more efficient.

In one embodiment of the invention there is provided an electricity generator in which there is provided a sump buffer tank intermediate the turbine and the sump tank. Again, a sump buffer tank may be used to calm the flow of water from the turbine before it is delivered into the sump tank.

In one embodiment of the invention there is provided an electricity generator in which the sump buffer tank is provided with at least one baffle plate.

In one embodiment of the invention there is provided an electricity generator in which the sump buffer tank has a depth of no less than 1 metre.

In one embodiment of the invention there is provided an electricity generator in which there is provided a rectifier connected to the output of the turbine.

In one embodiment of the invention there is provided an electricity generator in which there is provided a battery bank connected to the output of the rectifier for storing electricity generated by the turbine.

In one embodiment of the invention there is provided an electricity generator in which the valves are pneumatically-operated valves. Pneumatically operated valves are seen as an effective valve to use and there will be sufficient additional pressurized air available in the system to operate the valves.

In one embodiment of the invention there is provided an electricity generator in which there is provided a plurality of pressure switches, and in which the controller is responsive to the pressure switches. Pressure switches are seen as one useful way of operating the apparatus.

In one embodiment of the invention there is provided an electricity generator in which the pressurized air supply operable to pressurize air in the pressure chamber is configured to pressurize air in the pressure chamber to in excess of 2.0 bar.

In one embodiment of the invention there is provided an electricity generator in which the pressurized air supply comprises a feed line from an existing process.

In one embodiment of the invention there is provided a method of generating electricity comprising the steps of:

delivering a liquid from a sump tank into a pressure chamber;

sealing the pressure chamber;

delivering gas into the pressure chamber thereby pressurizing the gas in the pressure chamber;

opening a valve thereby opening the pressure chamber and permitting evacuation of the liquid from the pressure chamber through a flow line of an upright liquid conduit up to a head height;

delivering the evacuated liquid back down under gravity from the head height through a return line of the upright conduit and through a turbine;

harnessing the electricity generated by the turbine; and collecting the evacuated liquid from the turbine in the sump tank for subsequent redelivery of the liquid to the pressure chamber.

This is seen as a particularly simple and inexpensive method of generating electricity. It has been found that a small amount of pressurized air can be used to move a large volume of liquid, which in turn can be used to power a turbine. Therefore, the electricity can be generated very efficiently. The method can be performed above-water in a standalone installation. The method can be performed in a factory, hotel, office or other installation where it is desired to manufacture electricity inexpensively. The electricity generated in this manner may be used in the installation, or where regulatory bodies allow, exported to the grid.

In one embodiment of the invention there is provided a method of generating electricity in which the step of delivering gas into the pressure chamber thereby pressurizing the gas in the pressure chamber comprises delivering gas into the pressure chamber until the gas in the pressure chamber is at between 0.5 bar and 2.0 bar. Preferably, the gas will be air. The pressure described is a very low pressure that may be used to move a large volume of water. It is possible to generate this level of air pressure using a simple blower or like device. For example, a vacuum pump could be used instead of a blower. Some devices that may be suitable include a Roots (Registered Trade Mark,®) Blower, a side channel blower, a centrifugal blower or the like. It will be understood by the skilled addressee that numerous disparate devices will be suitable for this purpose. What is important is that the device chosen uses relatively little electricity but produces high volume/low pressure compressed air.

In one embodiment of the invention there is provided a method of generating electricity in which the step of delivering gas into the pressure chamber thereby pressurizing the gas in the pressure chamber comprises delivering air into the pressure chamber until the gas in the pressure chamber is at between 0.5 bar and 1.5 bar.

In one embodiment of the invention there is provided a method of generating electricity in which the step of delivering gas into the pressure chamber thereby pressurizing the gas in the pressure chamber comprises delivering air into the pressure chamber until the gas in the pressure chamber is at of the order of 0.7 bar.

In one embodiment of the invention there is provided a method of generating electricity in which the step of evacuating liquid from the pressure chamber through an upright liquid conduit further comprises pushing the liquid to a height to create a head of water above the sump tank of between 5.5 metres and 9 metres.

In one embodiment of the invention there is provided a method of generating electricity in which the step of evacuating liquid from the pressure chamber through an upright liquid conduit further comprises pushing the liquid to a height to create a head of water above the sump tank of the order of 8 metres.

In one embodiment of the invention there is provided a method of generating electricity in which the method comprises the intermediate step of temporarily storing the evacuated liquid in an elevated turbine buffer tank intermediate the pressure chamber and the turbine prior to delivering the evacuated liquid through the turbine.

In one embodiment of the invention there is provided a method of generating electricity in which the method comprises the intermediate step of temporarily storing the evacuated liquid in an exhaust tank intermediate the pressure chamber and the elevated turbine buffer tank prior to delivering the evacuated liquid to the elevated turbine buffer tank.

In one embodiment of the invention there is provided a method of generating electricity in which the method comprises the intermediate step of temporarily storing the evacuated liquid in a sump buffer tank prior to collecting the evacuated liquid from the turbine in the sump tank.

In one embodiment of the invention there is provided a method of generating electricity in which the step of delivering a liquid from a sump tank into a pressure chamber further comprises simultaneously venting the air from the pressure chamber. By simultaneously venting the air from the pressure chamber, the liquid will be able to enter the pressure chamber faster than would otherwise be the case, thereby speeding up the cycle of the method.

In one embodiment of the invention there is provided a method of generating electricity comprising the step of venting air from the pressure chamber during delivery of liquid from the sump tank into a pressure chamber and harnessing the energy from the vented air with a second turbine driven by the vented air. In this way, the method will be able to harness this additional energy making the method more efficient.

In one embodiment of the invention there is provided a method of generating electricity comprising the initial step of harnessing blow-off pressurized air from an existing external process and the step of delivering air into the pressure chamber thereby pressurizing the air in the pressure chamber further comprises delivering the harnessed blow-off pressurized air into the pressure chamber. This is seen as a particularly preferred method of the invention. In this way, pressurized "blow-off" air from an existing process will be captured and put to good use in the method according to the invention, reducing costs and increasing efficiency.

BRIEF DESCRIPTION OF THE DRAWINGS

The invention will now be more clearly understood from the following description of some embodiments thereof given by way of example only with reference to the accompanying drawings, in which:—

DETAILED DESCRIPTION OF THE DRAWINGS

Figure 1:
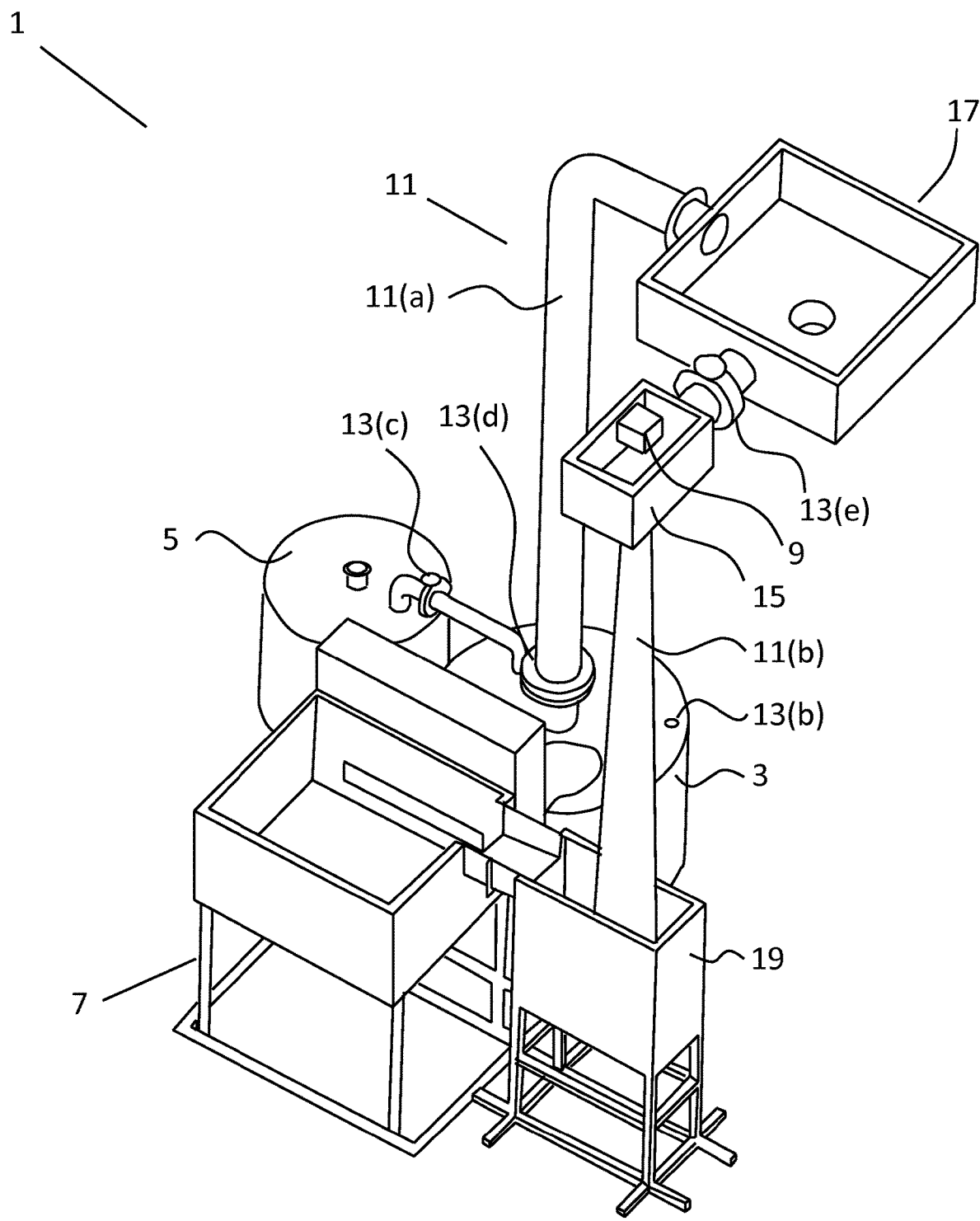
FIG. 1 is a perspective view of an electricity generator according to the invention.
Figure 3:
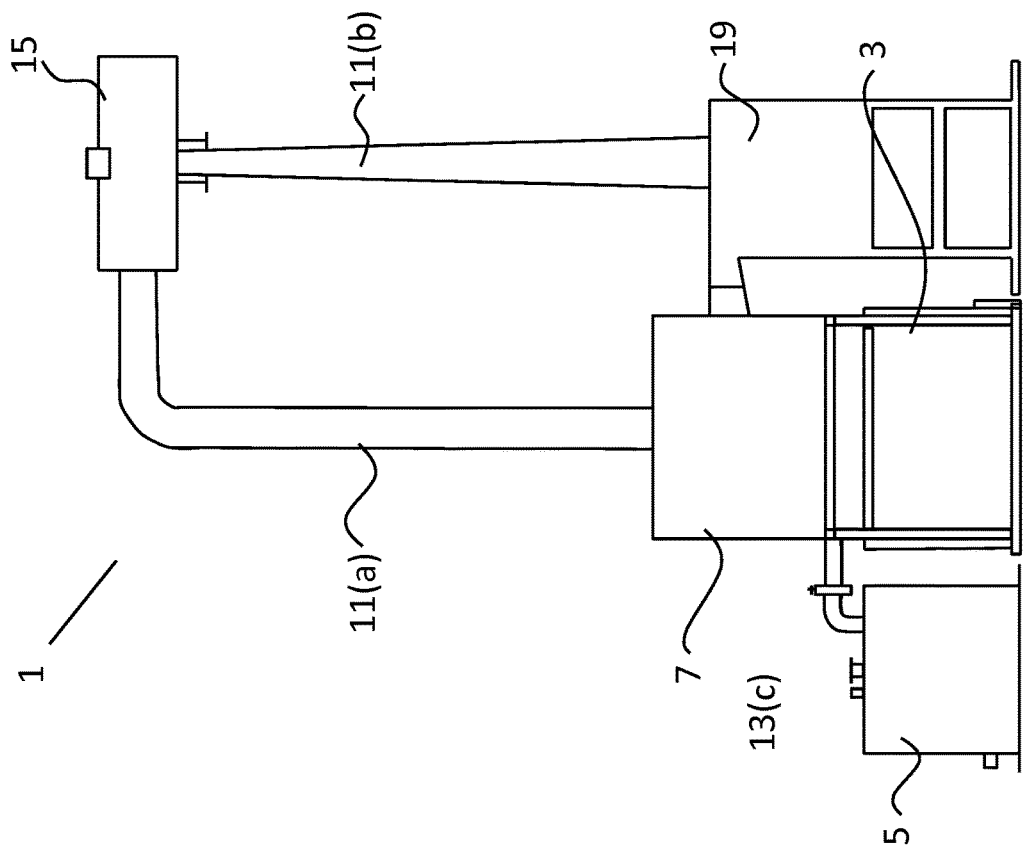
FIG. 3 is a side view of the electricity generator of FIG. 1.
Figure 2:
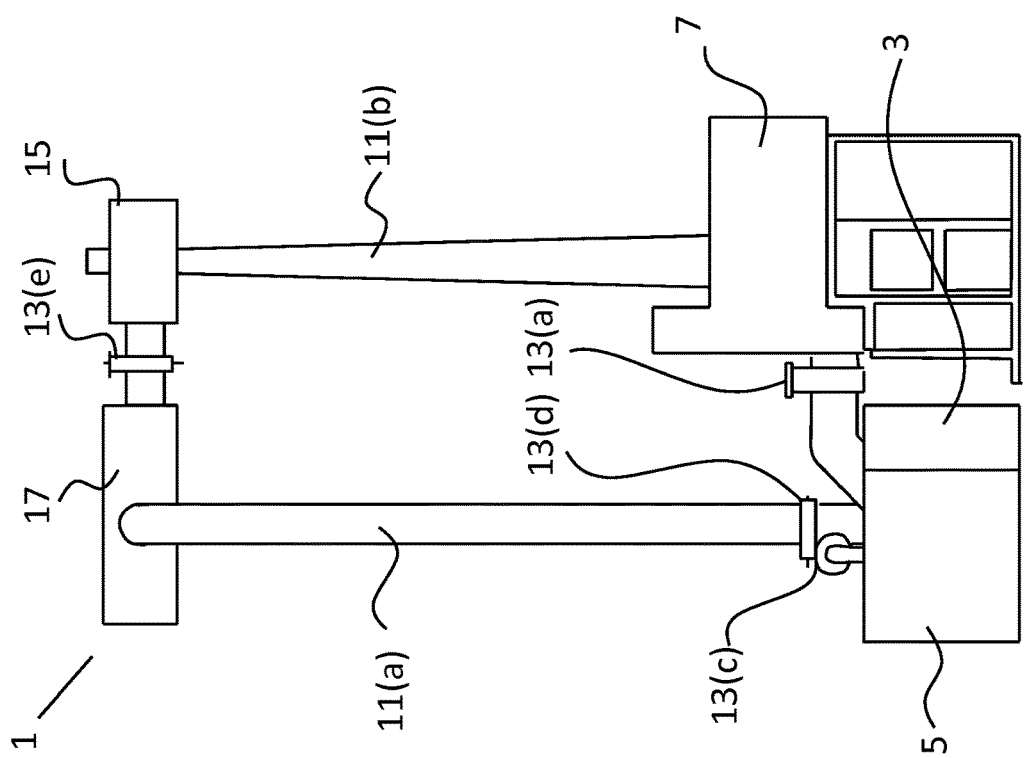
FIG. 2 is a front view of the electricity generator of FIG. 1.

Referring to FIGS. 1 to 3 inclusive, there is shown an electricity generator, indicated generally by the reference numeral 1. The electricity generator 1 comprises a pressure chamber 3, a pressurised air supply tank 5, a sump tank 7, a turbine 9 and a piping network 10 including an upright liquid conduit 11. There is further provided a liquid supply (not shown) contained therein. The upright conduit 11 further comprises a flow line 11(*a*) and a return line 11(*b*). The electricity generator comprises a plurality of valves 13(*a*), 13(*b*), 13(*c*), 13(*d*) and 13(*e*) arranged in the piping network 10 operable to control the flow of fluid through, into and out of the electricity generator, as will be described in greater detail below, and a controller (not shown) to control the operation of the valves.

The electricity generator 1 further comprises an elevated turbine buffer tank 15 and an elevated exhaust tank 17 along with a sump buffer tank 19.

In use, liquid, in this case water, is allowed flow from the sump tank 7 into the pressure chamber 3. This is achieved by opening valve 13(*a*) to allow the water to flow from the sump tank 7 into the pressure chamber and opening a releasably sealable air vent, provided by way of the valve 13(*b*) to exhaust air from the pressure chamber as the water flows into the pressure chamber from the sump tank. Once sufficient water has flowed from the sump tank into the pressure chamber, the valves 13(*a*) and 13(*b*) are closed and the valve 13(*c*) from the pressurised air supply tank 5 is opened. By opening the valve 13(*c*), the air in the pressure chamber 3 is pressurised. In the present embodiment, the air is pressurised up to 0.7 bar however it will be understood that other pressures may be used instead, as will be described in greater detail below.

Once the air pressure inside the pressure chamber 3 has reached 0.7 bar, the valve 13(*c*) remains open for a period of time and the valve 13(*d*) on the upright liquid conduit is opened. By opening the valve 13(*d*) on the upright liquid conduit, the air pressure inside the pressure chamber causes the water inside the pressure chamber to be expelled upwards through the flow line 11(*a*) of the upright liquid conduit with significant force up to the elevated exhaust tank 17. From there, valve 13(*e*) permits throughpassage of water and the water travels into the elevated turbine buffer tank and thereafter passes under gravity through the turbine 9 and down the return line 11(*b*) back to the sump tank. Valve 13(*e*) is in a normally open state unless the water height in the elevated turbine buffer tank is at maximum level in which case the valve 13(*e*) is temporarily closed and is reopened once the water level in the elevated turbine buffer tank 15 starts to drop. As the turbine 9 spins, the energy is harnessed and can be used subsequently to create electricity. The equipment to harness the electricity is well known in the field and has been omitted for clarity. In one embodiment of the present invention, valve 13(*c*) is opened for 1.5 seconds to allow the air pressure in the pressure chamber go from 0 to 0.7 bar and once the pressure has reached 0.7 bar, valve 13(*d*) is opened and 13(*c*) is left open. When the evacuation process is almost finished, the valve 13(*c*) is closed and then the valve 13(*d*) is closed once the air pressure in the pressure chamber reduces to 0.5 bar. It is important to note that, in the embodiment shown, the turbine is located at a high level. However, the turbine can also be placed at low level or at any point along the drop in the return line 11(*b*) of the upright conduit. Indeed, there could also be multiple turbines along the drop.

Once the water has passed through the turbine, the water is returned down to the sump buffer tank 19 and from there the water flows into the sump tank 7 for subsequent delivery to the pressure chamber 3. If desired, the sump tank 7 and/or the sump buffer tank 19 may be provided with water calming measures such as one or more baffle plates and indeed the depth of the sump tank and/or the sump buffer tank may be chosen to calm the water as it enters the tank. Once the water has returned to the sump, that water will be ready for delivery into the pressure chamber and the process can cycle once more.

It is envisaged with the arrangement as shown in FIGS. 1 to 3 inclusive, that the process may cycle three times per minute. It is further envisaged that the process could be from 1 to 10 cycles per minute. The pressure in the pressure chamber is increased to of the order of between 0.7 bar and 1.0 bar and the water is delivered at a rate of approximately 67 litres/second to the turbine 9. The turbine 9 is a suction turbine however it is envisaged that other turbines such as an impact turbine could be used to equally good effect. The upright liquid conduit 11 in the embodiment shown is dimensioned to provide a head of water above the sump buffer tank 19 from the elevated turbine buffer tank 15 of 5.5 metres in height. Such an embodiment has been proven capable of generating 600 W of power. However, the amount of power that the generator is capable of producing is believed to be far greater than 600 W as the prototype device has been deliberately throttled back by blocking approximately half of the turbine inlets (not shown) to purposely slow the machine down. It will be understood that the amount of power generated by the electricity generator can be altered by adjusting the length of the upright liquid conduit 11 (thereby adjusting the head of water) and/or adjusting the pressure of the air in the pressure chamber 3 (thereby adjusting the rate of flow of water through the turbine). Indeed, the device can be constructed with the energy requirement and/or the space parameters for a specific application.

Figure 4:
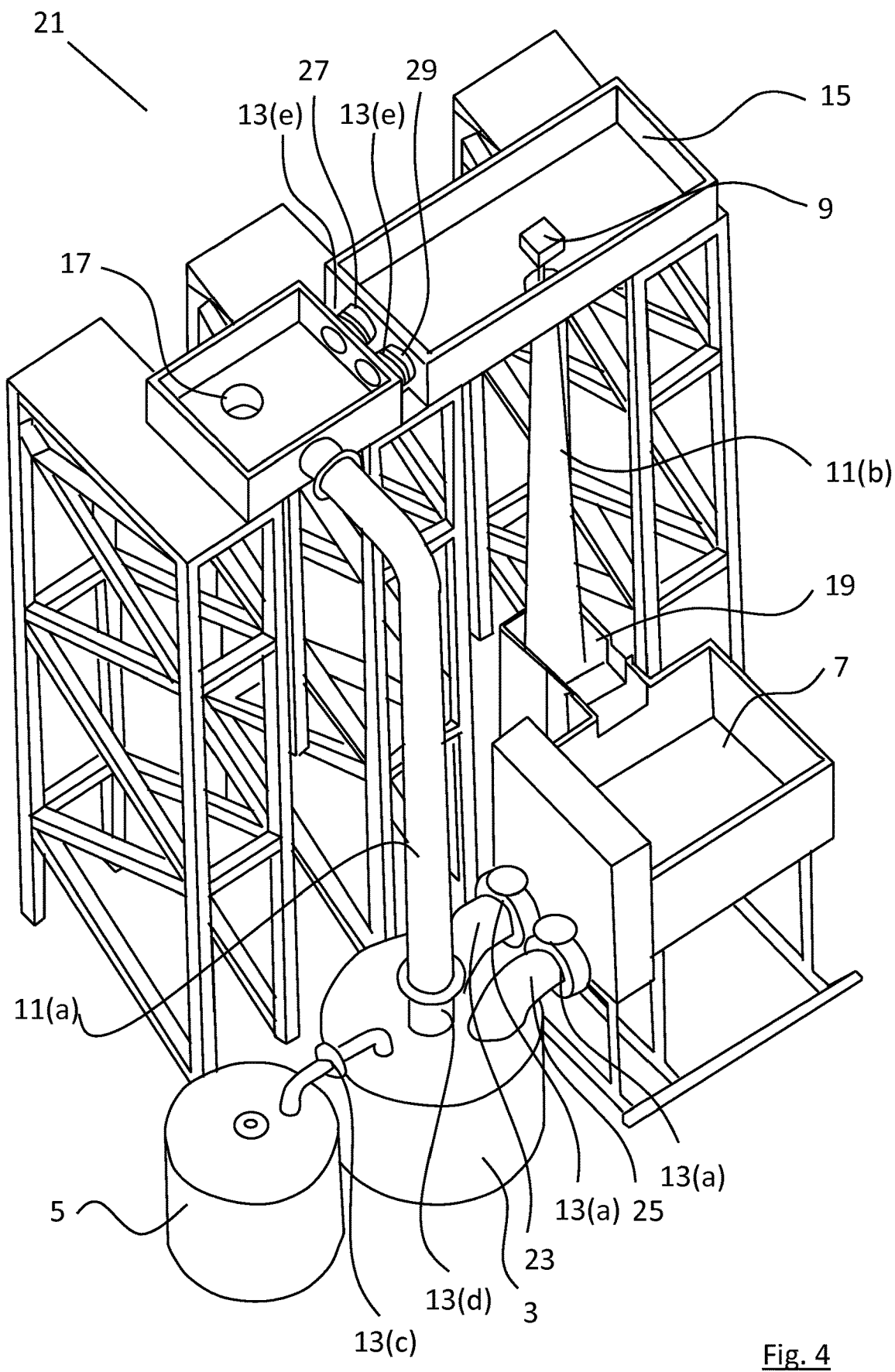
FIG. 4 is a perspective view of an alternative configuration of electricity generator according to the invention.

Referring now to FIG. 4, there is shown a second embodiment of electricity generator according to the invention, indicated generally by the reference numeral 21, where like parts have been given the same reference numeral as before. The electricity generator 21 differs from the electricity generator 1 of FIGS. 1 to 3 in that there is provided a pair of conduits 23, 25 to feed water from the buffer tank 7 into the pressure chamber 3 and a pair of valves 13(*a*), one for each conduit 23, 25. There is further provided a pair of conduits 27, 29 to feed water from the elevated exhaust tank 17 into the elevated turbine buffer tank 15 and a pair of valves 13(*e*), one for each conduit 27, 29. This will ensure that the water can be transferred quickly from the sump tank 7 to the pressure chamber 3 and from the elevated exhaust tank 17 to the elevated turbine buffer tank 15 respectively. In addition to the foregoing, the pressurised air supply tank 5 is shown "in-line" with both the pressure chamber 3 and the sump tank 7 rather than being offset perpendicular to the two tanks as shown in the previous embodiment of FIGS. 1 to 3 inclusive.

Figure 5:
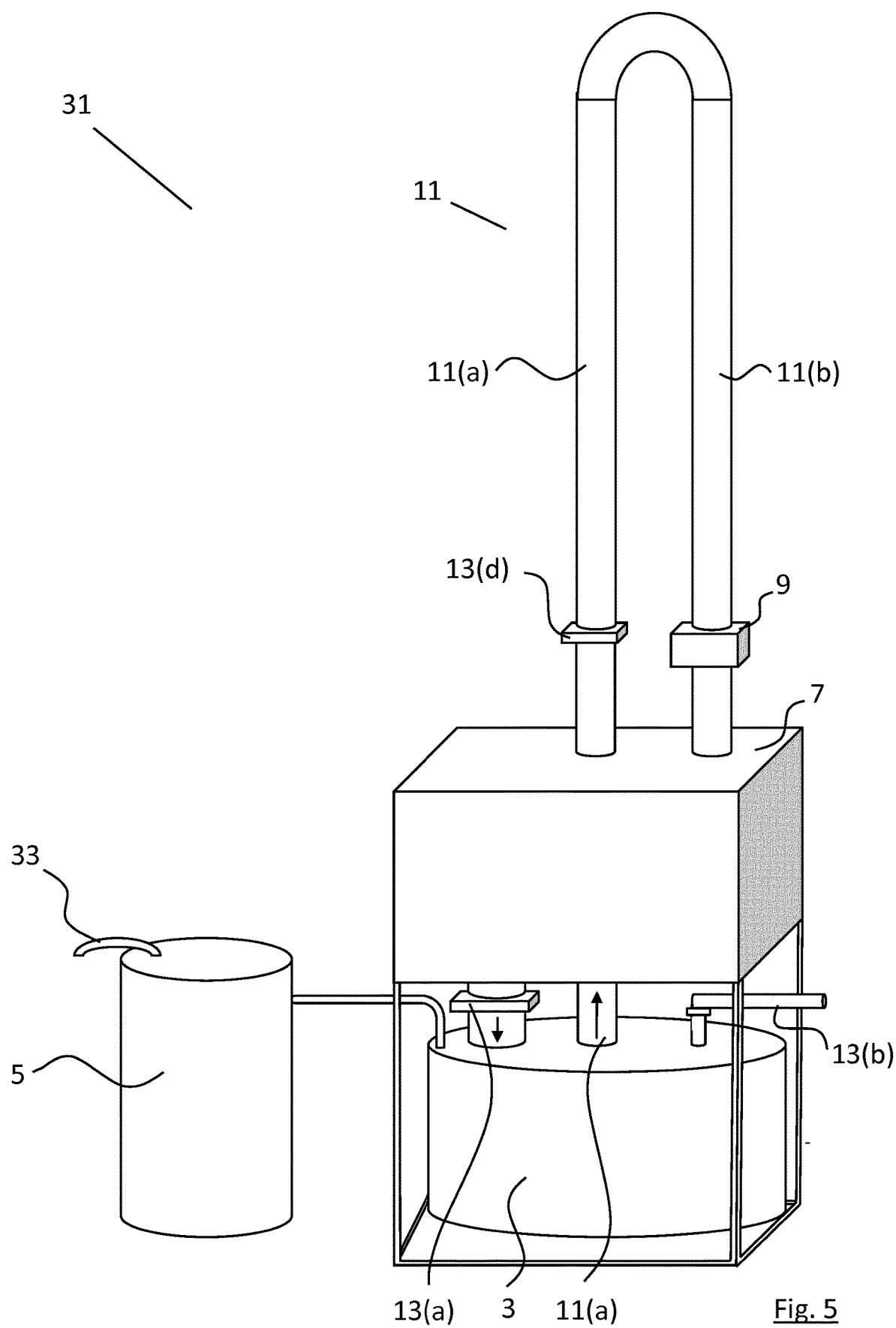
FIG. 5 is a perspective view of a further alternative configuration of electricity generator according to the invention.

Referring now to FIG. 5, there is shown a third embodiment of electricity generator according to the invention, indicated generally by the reference numeral 31, where like parts have been given the same reference numeral as before. The electricity generator 31 differs from the previous embodiments of electricity generator 1, 21 as illustrated in FIGS. 1 to 4 inclusive in that the electricity generator 31 has an impact turbine 9 located adjacent the lower part of the upright liquid conduit 11 and the electricity generator 31 does not have either of an elevated exhaust tank or an elevated turbine buffer tank. Instead, the water that is ejected from the pressure chamber 3 on opening of the valve 13(d) in the upright liquid conduit passes through the upright liquid conduit and passes directly through the turbine 9.

In addition to the foregoing, it can be seen that there is a feed line 33 into the pressurised air supply tank 5. The feed line 33 is fed from the "blow-off" or "idle time" air from an existing (not shown) manufacturing line. In this way, excess (or waste) pressurised air from an existing manufacturing process can be used to supply pressurised air to the electricity generator 31. It is envisaged that this supply method may be used in the other embodiments of electricity generator. Furthermore, the sump tank 7 is positioned directly above the pressure chamber 3. In this way, as the valve 13(a) is opened to allow water to flow from the sump tank 7 to the pressure chamber, the water will be able to flow quickly and freely into the pressure chamber. The upright liquid conduit 11 passes directly through the sump tank 7 but it will be understood that the interior of the upright liquid conduit 11 is isolated from the liquid in the sump tank 7 as the conduit 11 passes through the sump tank. As an alternative, the upright liquid conduit 11 could be configured to pass around the sump tank 7 or alternatively the sump tank could have a hollow core (for example it could be annular or toroidal in shape) so that the upright liquid conduit could pass upwards through the hollow core of the sump tank 7.

Figure 6:
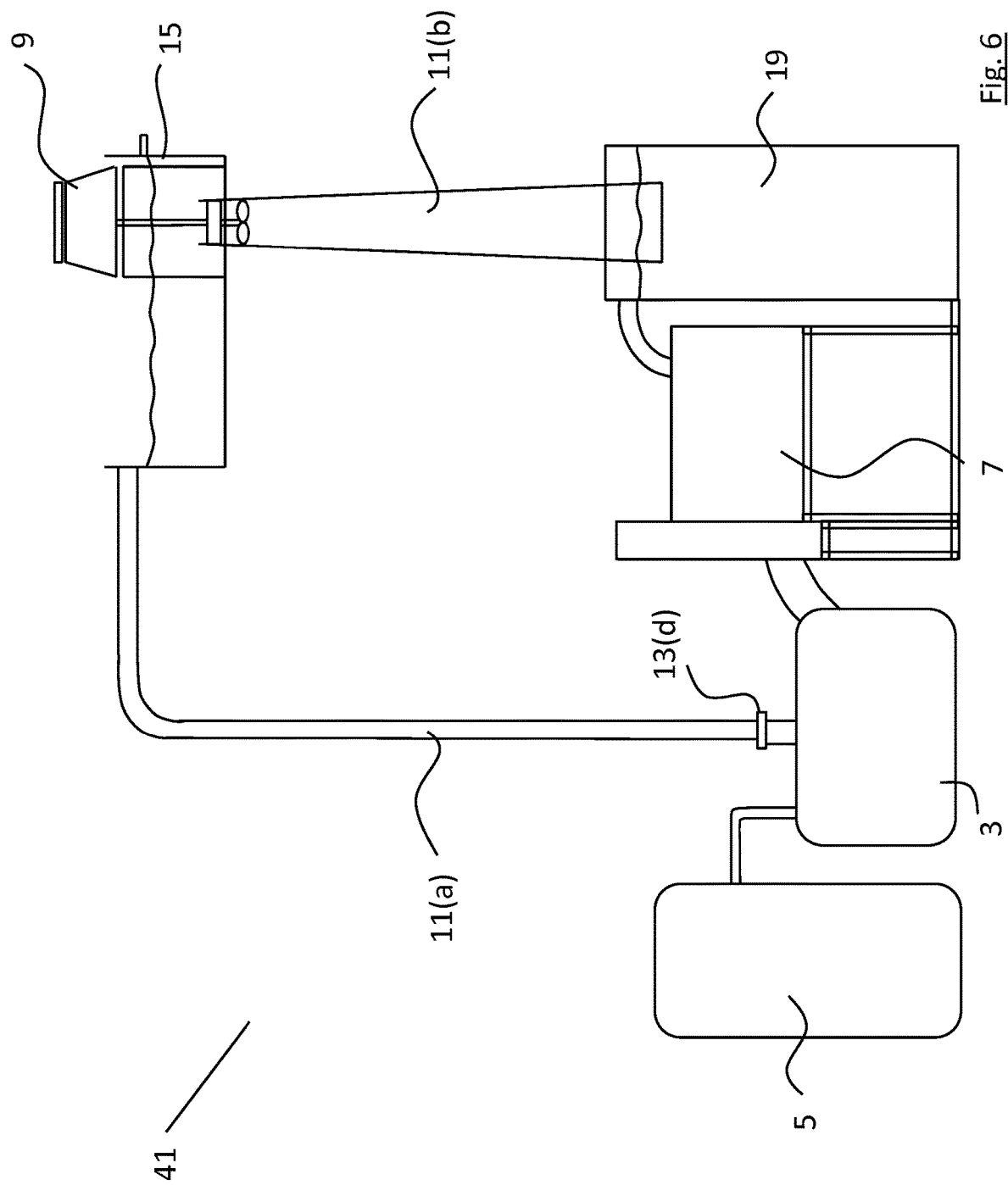
FIG. 6 is a diagrammatic representation of a fourth embodiment of electricity generator according to the invention.

Referring now to FIG. 6, there is shown a fourth embodiment of electricity generator according to the invention, indicated generally by the reference numeral 41, where like parts have been given the same reference numeral as before. In the embodiment shown in FIG. 6, some of the valves 13(a), 13(b) and 13(c) have been removed for clarity however it will be understood that those valves would be provided to ensure proper operation of the device. Furthermore, the elevated exhaust tank has been omitted and instead only an elevated turbine buffer tank 15 is provided. The elevated turbine buffer tank 15 may be provided with water calming measures such as one or more baffle plates (not shown) to calm the flow of incoming water through the upright liquid conduit 11 before it contacts the turbine 9.

In the embodiment shown in FIG. 6, it can be seen that the base of the upright liquid conduit 11, also referred to as a draft tube, is completely immersed in water in the sump buffer tank 19 at all times. The sump buffer tank 19 is elongated to reduce the turbulent effects of the water coming in from the draft tube. This can help to alleviate the need for baffling or other water calming measures. In the embodiment shown, the draft tube is shown without supports however a frame or suitable stays could be provided to support the draft tube.

It will be understood that the turbine 9 and more particularly its shaft output into the draft tube/upright liquid conduit 11 is isolated by mounting the turbine into its own elevated turbine buffer tank. The drive shaft for the turbine is fed through a hole (not shown) in the end of the turbine buffer tank. In the embodiment shown, this hole is 7 inches (0.1778 m) in diameter. The join between the upright liquid conduit 11 and the elevated turbine buffer tank 15 is sealed with silicone or other suitable sealant. It is envisaged that some leakage may be inevitable (potentially requiring topping up of the water levels from time to time from a suitable supply, not shown) however this leakage should diminish over time as any dirt in the water will reinforce the seal. The upper part of the turbine in the example shown is 9 inches (0.2286 m) in diameter. The head of water between the surface of the water in the elevated turbine buffer tank 15 and the surface of the water in the sump buffer tank 19 is 4 metres, the flow rate of water from the pressure chamber and over the turbine is approximately 68 litres per second.

The arrangement shown has a potential power output of up to approximately 1.5 kW. This would be possible if, inter alia, the air pressure was increased from 0.7 bar to 1.0 bar. In order to generate 1.5 kW of power, it would be necessary to exhaust 1000 litres of water from the pressure chamber four times a minute, giving a flow rate over the turbine of approximately 67 litres/second. The maximum theoretical power output is calculated by multiplying the flow rate (67) by the height of the head (4) by the gravitational constant (9.8)=2.62 Kw (approx.) maximum theoretical power output. Assuming an efficiency of 57.25%, this would achieve an actual power output of the order of 1.5 kW. If the height of the head were increased to 8 metres, the maximum theoretical power would be increased to 5.25 Kw and if one assumes a 70% efficiency, this would result in an actual power output of the order of 3.67 Kw.

In the embodiment shown in FIGS. 1 to 3 inclusive, it has been found through experimentation on a working prototype that only 0.7 bar is needed to move the volume of water. The pressure chamber of the prototype is limited to 1 tonne in its current configuration. With a larger air supply and larger pressurized chamber 0.7 bar will move much higher volumes of water to a height of 8 metres or more. In the current implementation illustrated in FIGS. 1 to 3 inclusive, the water is in fact raised 5.5 metres from the pressure chamber 3 to the exhaust tank 17.

It is envisaged that in some circumstances, the pressure available will exceed 2.0 bar and it is conceivable that the air pressure in the pressure chamber will be increased to in excess of 2.0 bar if the application so requires or is desirable (for example in those circumstances when high pressure blow off is available in a factory setting). In the embodiments described, the head of water above the sump tank is described as being up to 10 metres tall. However, it will be understood that this may be larger, for example up to 20 or 30 (or more) metres tall if desired. However, it is envisaged that many of the applications will require a head of water above the sump tank of less than 10 metres.

It will be understood that the head of water may vary as water is drawn through the turbine however it is highly desirable to closely monitor and control the head of water in the electricity generator so that it does not fluctuate significantly from the 5.5 metres shown. This is achieved through appropriate cycle timing and sized tanks and careful control of water ingress/egress from the elevated turbine buffer tank. In the embodiments shown, there is provided a sump buffer tank however this may be removed and alternative arrangements may be provided if desired. What is important is that the base of the upright liquid conduit 11 is immersed in water at all times and that there is sufficient water to be ejected into the pressure chamber when needed. The length of the draft tube/upright liquid conduit 11 may be varied and the size of the elevated turbine buffer tank may be altered to vary the amount of power output achievable from the electricity generator.

It will be understood that a number of different turbines could be used to good effect in the embodiments of electricity generator described. For example, water turbines or even turbines normally designed for harnessing wind power could be used to good effect in the electricity generators described. The turbines that could be used include but are not limited to a Pelton turbine, a Turgo turbine, a Crossflow turbine, a Francis turbine or a Kaplan turbine. Other turbines could be used to good effect.

In addition to the foregoing, it will be understood that the present invention also relates to a method of generating electricity in accordance with the foregoing description. The method operates on the basic premise that a small amount of compressed air may be used to move a large volume of water and that large volume of water may be effectively used to generate electricity. The air may be waste or "blow-off" air (or idle time compressed air) from an existing manufacturing process.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the appended claims.

The invention claimed is:

1. An electricity generator comprising;
   a pressure chamber having a releasably sealable air vent;
   a liquid supply;
   a sump tank configured to deliver liquid to the pressure chamber;
   a turbine;
   a piping network including an upright liquid conduit, the upright liquid conduit configured to deliver liquid from the pressure chamber and back to the sump tank through the turbine, the upright liquid conduit comprising a flow line for delivery of liquid from the pressure chamber up to a head height and a return line for delivery of liquid back down under gravity from the head height through the turbine to the sump tank;
   a pressurized gas supply operable to pressurize gas in the pressure chamber, and in which the pressurized gas supply comprises a feed line being fed from the blow-off or idle-time air from an existing manufacturing line;
   a pressurized gas supply operable to pressurize gas in the pressure chamber, and in which the pressurized gas supply comprises a feed line from an existing process;
   a plurality of valves; and
   a controller to operate the plurality of valves.

2. The electricity generator as claimed in claim 1 in which the pressurized gas supply operable to pressurize gas in the pressure chamber is configured to pressurize gas in the pressure chamber to between 0.1 bar and 2.0 bar.

3. The electricity generator as claimed in claim 1 in which the pressurized gas supply operable to pressurize gas in the pressure chamber is configured to pressurize gas in the pressure chamber to between 0.5 bar and 1.5 bar.

4. The electricity generator as claimed in claim 1 in which the upright liquid conduit extends upwardly from the pressure chamber by a distance sufficient to create a head of water above the sump tank of between 1 metre and 10 metres.

5. The electricity generator as claimed in claim 1 in which the upright liquid conduit extends upwardly from the pressure chamber by a distance sufficient to create a head of water above the sump tank of the order of 8 metres.

6. The electricity generator as claimed in claim 1 in which there is an elevated turbine buffer tank intermediating the pressure chamber and the turbine.

7. The electricity generator as claimed in claim 6 in which there is an elevated exhaust tank intermediating the pressure chamber and the elevated turbine buffer tank.

8. The electricity generator as claimed in claim 1 in which the sump tank is provided with at least one baffle plate.

9. The electricity generator as claimed in claim 1 in which the sump tank is located directly above the pressure chamber.

10. The electricity generator as claimed in claim 1 in which there is a sump buffer tank intermediating the turbine and the sump tank.

11. The electricity generator as claimed in claim 1 in which there is provided a rectifier connected to the output of the turbine.

12. The electricity generator as claimed in claim 11 in which there is provided a battery bank connected to the output of the rectifier for storing electricity generated by the turbine.

13. The electricity generator as claimed in claim 1 in which there is provided a plurality of pressure switches, and in which the controller is responsive to the pressure switches.

14. A method of generating electricity comprising the steps of:
   delivering a liquid from a sump tank into a pressure chamber;
   sealing the pressure chamber;
   delivering gas into the pressure chamber thereby pressurizing the gas in the pressure chamber;
   opening a valve thereby opening the pressure chamber and permitting evacuation of the liquid from the pressure chamber through a flow line of an upright liquid conduit up to a head height;
   delivering the evacuated liquid back down under gravity from the head height through a return line of the upright conduit and through a turbine to generate electricity;
   harnessing the electricity generated by the turbine; and
   collecting the evacuated liquid from the turbine in the sump tank for subsequent redelivery of the liquid to the pressure chamber; and
   in which the method comprises the initial step of harnessing pressurized air from an existing manufacturing line having blow-off or idle-time pressurized air, and the step of delivering gas into the pressure chamber thereby pressurizing the gas in the pressure chamber further comprises delivering the harnessed pressurized air from the manufacturing line into the pressure chamber.

15. The method of generating electricity as claimed in claim 14 in which the step of delivering gas into the pressure chamber thereby pressurizing the air in the pressure chamber comprises delivering gas into the pressure chamber until the gas in the pressure chamber is at between 0.1 bar and 2.0 bar.

16. The method of generating electricity as claimed in claim 14 in which the step of evacuating liquid from the pressure chamber through an upright liquid conduit further comprises pushing the liquid to a height to create a head of water above the sump tank of between 1 metres and 10 metres.

17. The method of generating electricity as claimed in claim 14 in which the step of evacuating liquid from the pressure chamber through an upright liquid conduit further comprises pushing the liquid to a height to create a head of water above the sump tank of the order of 8 metres.

18. The method of generating electricity as claimed in claim 14 in which the method comprises temporarily storing the evacuated liquid in an elevated turbine buffer tank intermediating the pressure chamber and the turbine prior to delivering the evacuated liquid through the turbine.

19. The method of generating electricity as claimed in claim 18 in which the method comprises the intermediating step of temporarily storing the evacuated liquid in an elevated exhaust tank intermediating the pressure chamber and the elevated turbine buffer tank prior to delivering the evacuated liquid to the elevated turbine buffer tank.

20. The method of generating electricity as claimed in claim 14 in which the method comprises; temporarily storing the evacuated liquid in a sump buffer tank prior to collecting the evacuated liquid from the turbine in the sump tank.

21. The method of generating electricity as claimed in claim 14 in which the delivering the liquid from the sump tank into the pressure chamber further comprises simultaneously venting the air from the pressure chamber.

22. The method of generating electricity as claimed in claim 14 comprising venting air from the pressure chamber during delivery of liquid from the sump tank into the pressure chamber and harnessing the energy from the vented air.

\* \* \* \* \*